United States Patent [19]

Zibell et al.

[11] Patent Number: 4,975,287
[45] Date of Patent: Dec. 4, 1990

[54] GUM COMPOSITION CONTAINING PROTEIN MACROCOLLOIDS

[75] Inventors: Steven E. Zibell, Blue Island; Lindell Richey, Lake Zurich; Michael A. Reed, Evanston; Roman M. Barabolak, Palos Park; Steven B. Courtright, Evanston, all of Ill.

[73] Assignee: Wm. Wrigley Jr. Company, Chicago, Ill.

[21] Appl. No.: 402,210

[22] Filed: Sep. 1, 1989

[51] Int. Cl.$^5$ .............................................. A23G 3/30
[52] U.S. Cl. ..................................... 426/3; 426/4; 426/41; 426/657; 426/548; 426/804
[58] Field of Search ........................................ 426/3–6, 426/41, 657, 548, 804

[56] References Cited

U.S. PATENT DOCUMENTS

| | | | |
|---|---|---|---|
| 2,154,482 | 4/1939 | Weber | 426/3 |
| 2,203,436 | 6/1940 | Kertess | 426/3 |
| 2,489,147 | 11/1949 | Lougovoy | 426/3 |
| 2,586,675 | 2/1952 | Lutz | 426/3 |
| 2,631,119 | 3/1953 | Ferguson | 426/3 |
| 3,255,018 | 6/1966 | Comollo | 426/4 |
| 4,479,969 | 10/1984 | Bahal et al. | 426/3 |
| 4,514,423 | 4/1985 | Tezuka | 426/3 |
| 4,734,287 | 3/1988 | Singer et al. | 426/41 |

*Primary Examiner*—Jeanette Hunter
*Attorney, Agent, or Firm*—Willian Brinks Olds Hofer Gilson & Lione

[57] ABSTRACT

A chewing gum that contains fro about 0.5 to about 30 percent of a proteinaceous, water-dispersible, macrocolloid comprising substantially non-aggregated particles of dairy whey protein.

7 Claims, No Drawings

GUM COMPOSITION CONTAINING PROTEIN MACROCOLLOIDS

BACKGROUND OF THE INVENTION

This invention relates in general to chewing gum compositions, in particular to an improved chewing gum that has protein macrocolloids.

Chewing gum basically includes a neutral and essentially tasteless masticatory chewing gum base and one or more non-masticatory active ingredients mixed into the base. Active ingredients are ingredients such as sweeteners, flavoring agents, flavor enhancers and potentiators and food-grade acids that determine flavor and taste characteristics of the gum. Other active ingredients include medicinal or pharmaceutical agents, or breath-freshening ingredients that treat or reduce bad breath. In addition, the chewing gum may and usually does contain water-soluble and usually sweet non-masticatory bulking agents, coloring agents, and plasticizing agents, the latter improving the texture of the gum.

One of the most important characteristics of gum is its "mouth feel" or chewability. Some gums tend to have a plastic or waxy feel. This is particularly true of gums that contain relatively high fat levels. High fat levels are particularly found in the so-called "low-tack" gums—gums that have low adhesion to dental work and the like. The high fat levels can also impart an underlying rancidity note to the gum. Low caloric content is another characteristic sought after in some gums.

In sugared gums, a problem is that the gum tends to harden with age. This is partly due to the crystallization of the corn syrup as it loses is water content.

SUMMARY OF THE INVENTION

According to the current invention, a chewing gum comprises a water-insoluble gum base and water-soluble bulk portion, and from about 0.5 to about 30 percent of a proteinaceous, water-dispersible, macrocolloid comprising substantially non-aggregated particles of dairy whey protein. In a dry state, the macrocolloid particles have a mean diameter particle size distribution ranging from about 0.1 microns to about 2.0 microns with less than about 2 percent of the total number of particles exceeding 3.0 microns in diameter.

The gum of the present invention can be a low-tack gum with the proteinaceous macrocolloid replacing all or part of the fats previously added to such gums. In low-tack gums, such macrocolloids replace the waxy mouth feel of such gums with a creamy texture. The gum of the present invention can also be a sugar-free, low calorie gum with the macrocolloids replacing all or part of the sorbitol. In replacing the sorbitol with such macrocolloids, it is possible to reduce the caloric content of the resulting gum because the macrocolloids can be added with appreciable amounts of water. With higher amounts of water effectively replacing the sorbitol, caloric content can be reduced.

The gum of the present invention can also be a sugared gum with the macrocolloids retaining the moisture needed to prevent the corn syrup (or other such liquefied sweetener) from crystallizing.

DESCRIPTION OF THE PRESENTLY PREFERRED EMBODIMENTS OF THE INVENTION

In the present invention, a chewing gum includes any chewable and substantially water-insoluble gum base in an amount ranging from approximately 5 to 99%, but preferably about 25% of the total chewing gum composition. The gum base may contain a calcium carbonate filler or a talc filler. The insoluble gum base generally includes elastomers, resins, fats and oils, waxes, softeners and inorganic fillers. Elastomers may include polyisobutylene, isobutylene-isoprene copolymer, styrene-butadiene, rubber as well as natural latexes, such as chicle. Resins include polyvinylacetate and terpene resins. Fats and oils may also be included in the gum base, including tallow, hydrogenated and partial hydrogenated vegetable oils, and cocoa butter. Commonly employed waxes include paraffin, microcrystalline, and natural waxes such as beeswax and carnauba.

The gum base typically also includes a filler component such as calcium carbonate, magnesium carbonate, talc, dicalcium phosphate and the like. The filler may constitute between about 5% to about 60% by weight of the gum base. Preferably, the filler comprises about 5% to 50% by weight of the gum base.

Gum bases typically also includes softeners including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further include softeners, sweeteners and flavoring agents and combinations thereof. Softeners are added to the chewing gum in order to optimize the chewability and mouth feel of the gum. Softeners, also known in the art as plasticizers and plasticizing agents, generally constitute between about 0.5% to about 15.0% by weight of the chewing gum. Softeners contemplated by the present invention include glycerin, lecithin, and combinations thereof. Further, aqueous sweetener solutions such as those containing sorbitol, hydrogenated starch, hydrolysates, corn syrup and combinations thereof may be used as softeners and binding agents in gum. The gum also includes flavoring agents from about 0.1% to 10.0% (preferably, from about 0.5% to about 3.0%) of the gum. The flavoring agents may comprise essential oils, synthetic flavors, or mixtures thereof, including but not limited to, oils derived from plants and fruits such as citrus oils, fruit essences, peppermint oil, spearmint oil, clove oil, oil of wintergreen, anise, and the like. Artificial flavoring components are often included. Those skilled in the art will recognize that natural and artificial flavoring agents may be combined in any sensorially acceptable blend. All such flavors and flavor blends are contemplated by the present invention.

Optional ingredients in the gum base include colors, emulsifiers and pharmaceutical agents.

The present invention contemplates the addition to the gum or gum base described above of from about 0.5 to about 30 percent of a proteinaceous, water-dispersible, macrocolloid comprising substantially non-aggregated particles of dairy whey protein. In a dry state, the macrocolloid particles have a mean diameter particle size distribution ranging from about 0.1 microns to about 2.0 microns with less than about 2 percent of the total number of particles exceeding 3.0 microns in diameter.

A method for making such macrocolloids is disclosed in U.S. Pat. No. 4,734,287 to Singer et al. entitled Protein Product Base issued Mar. 29, 1988, which is incorporated herein by reference.

In general, the chewing gum of this invention is manufactured by sequentially adding the various chewing gum ingredients to a commercially available mixer known to one skilled in the art. After the ingredients have been thoroughly mixed, including the proteinaceous macrocolloids, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerine may also be added along with syrup and a portion of the bulking agent. Further portions of the bulking agent may then be added to the mixture along with the macrocolloids. The macrocolloids preferably are added after the gum base has been melted and after the emulsifier has been added to avoid heating the proteinaceous material to the point where it may be denatured. Flavoring agents are typically added with the final portion of the bulking agent. Sweeteners can be added after the final portion of the bulking agent further have been added.

The entire mixing procedure typically takes from 5 to 15 minutes, but longer mixing times may sometimes be required. Those skilled in the art will recognize that many variations of the above described procedures may be followed including addition of the macrocolloids early or late in the mixing process.

In a low tack gum, the gum Will be prepared using conventional gum ingredients and a non-tack base that contains from 5 to 35% elastomer, 5 to 50% hydrogenated oils, 5 to 50% inorganic fillers, and fatty acids or mono or diglycerides in amounts of from 1 to 20%. Macrocolloids will be used as complete or partial replacement for the hydrogenated oil, the fatty acids or the mono or diglycerides and are preferably used at a level of 5 to 25% of the base with consequent reductions in level of the replaced ingredients.

In a sugar-free gum, the gum preferably contains from about 20–75 percent by weight alditol (e.g. sorbitol, xylitol, mannitol or combinations thereof), 5–55 percent gum base, 0.5–2.0 percent flavoring, 3–20 percent glycerin, 0–20% sorbitol solution or hydrogenated starch hydrolysate syrup. Additionally, the gum contains from about 5 to about 30 percent by weight of macrocolloids. Colorings and artificial sweeteners may also be added.

In a sugared gum, the gum contains from about 20 to 60% sugar (e.g. dextrose, sucrose and the like), 5 to 55% gum base, 1 to 25% liquid softener (e.g. corn syrup hydrogenated starch hydrolysate syrup or glycerin) and about 0.5 to 2% flavor. Additionally, the gum contains from about 5 to about 30% of the macrocolloidal protein described above as a complete or partial replacement for the sugar.

The following examples of the invention are provided by way of explanation and illustration. They are not intended to limit the invention.

EXAMPLE I

Peppermint Non-Tack Gum (A) Preparation of Gum Base

A gum base set forth in Table I below is prepared as described below.

TABLE I

| Ingredient | Parts by Weight |
|---|---|
| Polyvinyl Acetate | 27.36 |
| Macrocolloids | 28.32 |
| Calcium Carbonate | 14.40 |
| Polyisobutylene (Molecular Weight 6–12M) | 20.28 |
| Isobutylene-isoprene Copolymer | 10.80 |
| Mono and Diglycerides of Fatty Acids | 2.04 |
| Hydrogenated Cotton Seed Oil | 16.80 |

Specifically, the polyvinyl acetate, polyisobutylene, and the isobutylene-isoprene copolymer are melted, and added to a mixer. Then the macrocolloids (prepared as described above) and remaining ingredients are added and mixed until the mixture is well mixed.

(B) Preparation of Peppermint Gum

To the base of part B, sugar, 45° Be' corn syrup, glycerin, and peppermint oil, are added in the proportions by weight set forth in Table II.

TABLE II

| Ingredient | Percent by Weight |
|---|---|
| Base | 20.0 |
| Sugar | 61.3 |
| 45° Be' Corn Syrup | 17.4 |
| Glycerin | 0.7 |
| Peppermint Oil | 0.6 |

EXAMPLE II

Spearmint Sugarless Gum

LADCO Astro Base (A) 2031, a commercially available gum base from the L.A. Dreyfus Company of Edison, N.J., is mixed with an aqueous solution of 70% sorbitol, crystalline sorbitol, glycerin, spearmint oil, and macrocolloids according to the proportions in Table III to produce a spearmint gum that is rolled into sheets and cut into pieces.

TABLE III

| Ingredient | Percent by Weight |
|---|---|
| LADCO Astro Base (A) 2031 | 25.0 |
| 70% Sorbitol Solution | 15.0 |
| Sorbitol | 51.3 |
| Glycerin | 5.0 |
| Spearmint Oil | 1.3 |
| Macrocolloids | 2.4 |

EXAMPLE III

Sugared Cherry Gum

LADCO Bubble Base T 2198, a commercially available gum base available from L.A. Dreyfus Company, is mixed with 43° Be' corn syrup, sugar, glycerin, cherry flavor, and macrocolloids (prepared as described above) according to the proportions in Table IV to produce a cherry-flavored gum that is rolled into sheets and cut into pieces.

TABLE IV

| Ingredient | Percent by Weight |
|---|---|
| LADCO Bubble Base T 2198 | 20.0 |
| 43° Be' Corn Syrup | 25.0 |
| Sugar | 52.7 |

TABLE IV-continued

| Ingredient | Percent by Weight |
| --- | --- |
| Glycerin | 0.5 |
| Cherry Flavor | 0.6 |
| Macrocolloids | 1.2 |

EXAMPLE IV

Macrolloids As Flavor Emulsifier in Chewing Gum

Use of Macrocolloids as a flavor emulsifier whereby the flavor emulsion has a mayonnaise-like texture is advantageous in chewing gums. This flavor emulsion when added to gum will retain the flavor material substantially in the emulsion-sugar phase instead of substantially in the base itself. This will improve the flavor by preventing flavor from being trapped in the base.

(a) A flavor emulsion is prepared as follows in a high speed mixer.

| | |
| --- | --- |
| Water | 27.0 |
| Flavor | 30.0 |
| macrocolloids | 40.0 |
| Lecithin | 3.0 |

(b) Sugar gum with macrocolloids using the flavor emulsion from part (a) is prepared by blending the following ingredients in a conventional manner. A gum base such as LADCO Bubble Base T2198 can be used.

| Ingredient | Weight % | Range |
| --- | --- | --- |
| Sugar | 50.9 | 10–80 |
| Gum Base | 21.0 | 15–35 |
| Corn Syrup | 14.6 | 1.6–20.0 |
| Dextrose | 10.0 | 1.0–15.0 |
| Glycerine | 0.9 | 0.05–5.00 |
| Flavor | 0.6 | 0.05–2.00 |
| Macrocolloid Emulsion from part (a) | 2.0 | 0.25–10.0 |

EXAMPLE V

Spearmint Gum with macrocolloids added as texture (A) Preparation of gum base

A gum base is prepared in a conventional manner by blending the following ingredients:

TABLE VI

| Ingredient | Weight Percent |
| --- | --- |
| Polyvinylacetate | 28.25 |
| Jelutong | 23.19 |
| Sorva | 6.21 |
| Hydrogenated Rosin Ester | 11.85 |
| Polyisobutylene | 4.29 |
| Isobutylene-Isoprene Copolymer | 6.22 |
| Calcium carbonate | 6.11 |
| Mono and Diglycerides | 4.01 |
| Hydrogenated cotton seed oil | 1.87 |
| Wax | 8.00 |

(B) To base of A add sugar 45° Be' corn syrup, glycerin, spearmint oil and macrocolloids according to the proportions in Table IV, to make anyone of three spearmint gum formulations A-C.

TABLE VII

| Ingredient | Percent Weight | | |
| --- | --- | --- | --- |
| | A | B | C |
| Base | 20.0 | 22.0 | 24.0 |
| Sugar | 58.9 | 60.3 | 60.3 |
| 45° Pre corn syrup | 17.4 | 10.0 | 4.0 |
| Glycerin | 0.7 | 0.7 | 0.7 |
| Spearmint | 1.0 | 1.0 | 1.0 |
| Macrocolloids | 2.0 | 6.0 | 10.0 |

EXAMPLE VI

A neutral base with macrolloids replacing fats and oils in the base can be prepared using conventional blending techniques with ingredients set forth below.

| | Weight % |
| --- | --- |
| Polyvinyl Acetate (Low MW) | 22.55 |
| Polyisobutylene | 15.95 |
| Hydrogenated Cottonseed Oil | 10.58 |
| Hydrogenated Soybean Oil | 10.58 |
| Calcium Carbonate | 13.28 |
| Butyl Rubber | 9.96 |
| Glycerol mono stearate | 1.44 |
| BHA | 0.04 |
| Macrocolloids | 15.62 |

EXAMPLE VII

The following are examples of how to use macrocolloids in encapsulation techniques in the processing of chewing gum.

1. Water is used in the hydration of the processed macrocolloids as disclosed above. This water can be supersaturated with high intensity sweetener (Ember, Nusit, Alitame, etc.) and then used to hydrate the macrocolloids that are used in gums described above. A faster release of sweetener and better distribution of the flavor in the mix will occur.

2. Replace the water in the hydration of the macrocolloids with a low bloom gelatin encapsulation system with gum ingredients set forth below.

10% gelatin bloom 100.
20–25% active ingredient (high intensity sweetener, acidulents, liquids (e.g. flavor), fillers, etc.).
65–70% water.

Dissolve the active ingredient in the water. Heat the solution to 140° F., and add the gelatin. When a solution is obtained, cool and add the dry macrocolloids in proportions described above. Whip or stir to full hydration.

The result is a high density product which will exhibit sustained release properties when incorporated into a chewing gum at an appropriate level.

3. The product of #2 can also be combined with liquid flavors to extend their release.

4. Because of the high water content in hydrated macrocolloids, it can be used as a granulating agent alone or in conjunction with other agents.

Alone:
40% active ingredient
60% macrocolloids (hydrated)
(45% water–15% whey and albumin protein)

With Other Agents:
15% active ingredient (any powder)
38.3% additional granulating agent dry or wet
46.7% macrocolloids (hydrated)

Granulate in low sheer mixer or granulation dry and dry to particle size desired.

5. Wax or fat encapsulation are enhanced by the incorporation of additional protein in the form of macrocolloids. In wax granulation or spray chilling operations:

Hydrate and heat macrocolloids until liquid.
Mix with molten wax or fatty acids; (33% macrocolloids, 66% wax).
Granulate and cool.
Grind to desired particle size.

Dehydrated macrocolloids can also be used in the molten wax or material to be spray chilled in the following proportions:

1–20% macrocolloids
99–80% Chilling material

Other combinations are of course possible, along with other materials and processes.

EXAMPLE VIII

Sugarless Reduced Calorie Chewing Gum

A sugarless chewing gum containing 50% fewer calories than a typical sugarless gum can be prepared according to the following formula, using conventional blending techniques:

| % By Weight | Ingredient |
| --- | --- |
| 17.31 | Sorbitol |
| 30.18 | Base |
| 8.00 | Glycerin |
| 5.00 | Xylitol |
| 5.00 | Talc |
| 3.31 | Strawberry Flavor |
| 0.60 | Citric Acid |
| 0.25 | Aspartane |
| 0.20 | Malic Acid |
| 0.10 | Lecithin |
| 0.05 | Color |
| 30.00 | Macrocolloids |

EXAMPLE IX

Bubble Gum With Macrocolloids

The formation of a complex of macrocolloids with the flavoring systems normally used in Bubble Gum can significantly prolong the flavor duration. High intensity sweeteners can also be included in the macrocolloids/flavoring complex to add sweetness to this prolonged flavor release. The following formulation is illustrative.

| Ingredient | Weight % |
| --- | --- |
| Bubble Gum Base | 25 |
| Sugar | 38–53 |
| Corn Syrup | 18 |
| Lecithin | 0–1 |
| Colors | 0–0.2 |
| macrocolloids | 3–15 |
| Flavor | 0–2 |
| High Intensity Sweetener | 0–0.5 |

The flavoring and high intensity sweeteners in liquid form are complexed with the macrocolloids by cold plating. The flavoring and high intensity sweeteners are sprayed into the tumbling mass of macrocolloids in a double ribbon blender until uniformly mixed. Any flavorings or high intensity sweeteners in the dry form are then dusted into the tumbling mass and mixed until thoroughly mixed. The macrocolloid-flavoring-sweetener complex is added to the molten bubble gum base and thoroughly mixed in a high shear mixer such as a sigma mixer. The remaining ingredients are added to the mixer in a manner normally used in the manufacturing process. The inclusion of the macrocolloid-flavoring sweetener complex provides flavor and sweetness release which is significantly prolonged over many conventionally normally produced bubble gum.

EXAMPLE X

Sugar-Free Gum

A sugar-free gum is made by combining the ingredients set forth below.

TABLE VIII

| Ingredient | Weight (%) |
| --- | --- |
| Sorbitol | 49.8 |
| Base | 24.4 |
| Hydrogenated starch hydrolysate | 9.1 |
| Mannitol | 8.0 |
| Glycerin | 6.3 |
| Peppermint Flavor | 1.6 |
| Macrocolloids | 0.5 |
| Aspartane | 0.2 |
| Coloring | 0.1 |

The base employed is Nova Base available from the L.A. Dreyfus Company of Edison, N.J. The ingredients are mixed using conventional techniques. While several embodiments of the invention have been described, other embodiments will be apparent to those of ordinary skill in the art. Such embodiments are to be included within the scope of the present invention unless the following claims expressly state otherwise.

I claim:

1. A chewing gum, comprising:
   a water-insoluble gum base and water-soluble bulk portion comprising softeners, sweeteners, flavoring agents or combinations thereof, and from about 0.5 to about 30 percent of a proteinaceous, water-dispersible, macrocolloid comprising substantially non-aggregated particles of dairy whey protein.

2. The chewing gum of claim 1 wherein in a dry state, the macrocolloid particles have a mean diameter particle size distribution ranging from about 0.1 microns to about 2.0 microns with less than about 2 percent of the total number of particles exceeding 3.0 microns in diameter.

3. The chewing gum of claim 2 wherein said water-soluble bulk portion includes a sweetener.

4. The chewing gum of claim 3 wherein said water-soluble portion further includes a flavoring agent.

5. A chewing gum, comprising:
   from about 5 to 35 percent elastomer, from about 5 to 50 percent hydrogenated oils, from about 5 to 50 percent inorganic fillers, from about 1 to 20 percent of a member of the group selected from fatty acids, monoglycerides, diglycerides, or combinations thereof, and from about 5 to 25 percent macrocolloids comprising substantially non-aggregated particles of dairy whey protein.

6. A chewing gum, comprising:
   from about 20 to 75 percent alditol, from about 5 to 55 percent gum base, from about 3 to 20 percent glycerin, from about 0 to 20 percent of a member of the group selected from sorbitol solution, hydrogenated starch hydrolysate syrup, or combinations thereof, and from about 5 to about 30 percent by weight of macrocolloids comprising substantially non-aggregated particles of dairy whey protein.

7. A chewing gum, comprising:
from about 20 to 60 percent sugar, from about 5 to 55 percent gum base, from about 1 to 25 percent liquid softener, and from about 5 to 30% macrocolloids comprising substantially non-aggregate particles of dairy whey protein.

* * * * *

UNITED STATES PATENT AND TRADEMARK OFFICE
CERTIFICATE OF CORRECTION

PATENT NO. : 4,975,287
DATED : December 4, 1990
INVENTOR(S) : Steven E. Zibell et al.  Page 1 of 2

It is certified that error appears in the above-identified patent and that said Letters Patent is hereby corrected as shown below:

IN THE ABSTRACT

In line 1 of the Abstract, please delete "fro" and substitute therefor --from--.

In column 3, line 31, please delete "Will" and substitute therefor --will--.

In column 5, line 47, after "texture" please insert --modifier--.

In column 6, in TABLE VII under the heading "Ingredient", please delete "Pre corn syrup" and substitute therefor --Be' Corn Syrup--.

In column 6, line 15, please delete "macrolloids" and substitute therefor --macrocolloids--.

In column 7, line 46, after "macrocolloids/" please delete "-".

UNITED STATES PATENT AND TRADEMARK OFFICE
CERTIFICATE OF CORRECTION

PATENT NO. : 4,975,287

DATED : December 4, 1990

INVENTOR(S) : Steven E. Zibell et al.

It is certified that error appears in the above-identified patent and that said Letters Patent is hereby corrected as shown below:

In claim 7, line 4, please delete "30%" and substitute therefor --30 percent--.

Signed and Sealed this

Twenty-ninth Day of June, 1993

*Attest:*

*Attesting Officer*

MICHAEL K. KIRK

*Acting Commissioner of Patents and Trademarks*